UNITED STATES PATENT OFFICE 2,293,023

RESINS OF THE SULPHUR DIOXIDE-OLEFIN TYPE

Robert C. Hills and Maxwell M. Barnett, Port Sulphur, La.

No Drawing. Application February 20, 1939, Serial No. 257,336

7 Claims. (Cl. 260—94)

This invention relates to resins of the sulphur dioxide-olefin type and to methods of preparing the same.

The British Patent No. 11,635 of 1914 and other sources in the literature disclose that polymerization products may be produced under proper conditions by the reaction of sulphur dioxide with active olefin compounds and other active unsaturated organic compounds, such as ethylene, propylene, butene-1, butene-2, isobutene, pentene-1, pentene-2 and higher mono-olefins; butadiene, pentadiene and other conjugated diolefins; and polyfunctional unsaturated compounds of the nature of allyl alcohol and its ethers.

The usual method described in the literature for producing the polymers involves reacting sulphur dioxide with the active unsaturated organic compounds in sealed glass tubes or steel bombs, at comparatively low temperatures and with the aid of light or other catalytic agents. Sulphur dioxide is used in a quantity exceeding that required for the reaction. In some cases the excess of sulphur dioxide apparently serves to dissolve the resin that is formed, leading to colorless viscous substances which, upon release of pressure, solidify and form hard, horny or spongy solids of comparatively high melting point. In other cases, the resin has been stated to be insoluble in the reaction mixture and to form a turbid mass or a mixture of the viscous substance with a white solid. This reaction mass, upon breaking the seal or releasing the pressure on the reaction vessel and heating to evaporate the excess or unreacted initial materials, invariably results in comparatively hard or horn-like masses still containing unreacted materials, particularly sulphur dioxide. The excess sulphur dioxide is extremely difficult if not impossible to remove, even if the solid is finely ground or dissolved in a non-reactive solvent and subsequently precipitated. The presence of sulphur dioxide or of the olefin in the resin is objectionable, for the presence of such substances, even in minute quantities, leads to discoloration, or the presence of a large number of bubbles, or white spots, in products molded from the resin, and also to eventual decomposition of the resin.

An object of the present invention is to produce resins through the reaction between sulphur dioxide and active unsaturated organic compounds which may be molded under heat and pressure, or injection molded, to produce bubble-free, stable, strong, hard molded products. A specific object is to provide a method of producing such resins by which the same are obtained in the form of a powder capable of being freed of impurities and prepared for use with easily performed treatments. Yet another object is to provide molding compounds of the type indicated which possess a high degree of stability and which also possess qualities that permit them to be molded at relatively low temperatures. Other objects and advantages will be obvious from the desription hereinafter set out.

An outstanding novel feature of the instant invention, through which a number of the above mentioned objects are attained, involves the step of precipitating the reaction product of the sulphur dioxide and the olefin or other unsaturated compound when such product is at a comparatively low molecular weight and, at the same time, is in the form of discrete particles from which excess reactants may be removed by simple means, as by filtering and washing. The particles of the resin may be obtained in extremely finely divided form, or as fine as face powder, and may be melted or softened at temperatures much lower than those of the corresponding materials as produced by prior methods.

More specifically, the invention involves reacting sulphur dioxide with an active olefinic or other unsaturated compound in the presence of any one or more of a number of solubility regulators, hereinafter more fully described, thereby forming a resinous reaction product in the form of discrete particles, removing the solubility regulator and other unreacted materials, if any, by filtering and washing, and, if desired, drying to obtain a granular or powdered resinous product suitable for compounding with other materials or for molding at elevated temperatures. The resinous product possesses several outstanding qualities, including freedom from materials which gasify and produce bubbles at molding temperatures and a lower melting or softening temperature permitting molding at a temperature which, in one case, is fifty degrees lower than the product of the prior art produced from the same reactants but without the solubility regulator.

The solubility regulators used in the instant process are organic liquids of the most varied type, most, if not all, of which possess the following general characteristics in varying degrees: (1) They are non-solvents for the resin polymer produced by the reaction. (2) They are miscible in the reaction mixture. (3) They are either inert in the reaction mixture, or they do not interfere with the initiation or completion of the desired degree of reaction. (4) They ordinarily must be readily removable from the reaction product. (5) Lastly, they must possess the property of, or capacity for, rendering the resinous product, when the proper physical characteristics have been reached, insoluble in the reaction mixture under the prevailing conditions, as of temperature. These regulators have an effect on the reaction quite different from reaction inhibitors known to the prior art, such as methyl ethyl ethylene, and should not be confused therewith.

These listed properties do not appear to be possessed by any known general class of compounds. Of the many dozens of organic liquids investigated, which appeared to have possibilities for use in accordance with the present invention, only about a dozen have been found to give good results and another dozen fair results, the remainder either being very poor or totally useless. In addition to the examples hereinafter mentioned, however, other examples of compounds suitable for use as the solubility regulators according to this invention will undoubtedly be ascertained by further experimentation in the light of our disclosures.

The solubility regulators found to produce the resins in the most satisfactory precipitated form comprise, isopropyl alcohol, n-butyl alcohol, secondary-butyl alcohol, tertiary butyl alcohol, n-amyl alcohol, secondary-amyl alcohol, tertiary-amyl alcohol, iso-amyl alcohol, secondary-butyl carbinol, propionic acid and diethylether. Precipitated resins of fairly good properties can be obtained by the use of the following compounds; petroleum ether, benzene, methyl alcohol, ethyl alcohol, n-propyl alcohol, ethylene glycol monoethylether, toluene, xylene, o-dichlorobenzene, amyl-acetate and diethyl carbonate.

From the standpoint of their effect upon the subsequent steps of the complete process, the above solubility regulators may be divided into two classes, namely, those which are substantially water-soluble, such as isopropyl alcohol, ethyl alcohol and propionic acid, and those which are substantially water-insoluble. The use of the water-soluble compounds, in accordance with one embodiment, provides processes which may be operated with facility and economy in view of the fact that water may be used for the removal of the solubility regulator, as well as the last traces of sulphur dioxide, upon completion of the reaction. When solubility regulators are employed which are soluble only in organic solvents, then an organic solvent is generally necessary or desirable for the purifying operation. Where the resin is to be used in solution in organic solvents, the removal of the solubility regulator may not be necessary.

The use of the solubility regulators in accordance with the present invention should not be confused with the use of small amounts of alcohol, acetone and the like as employed in prior processes. In these prior processes, about five per cent by volume of such liquids has been used as a solvent for the catalyst, or to prevent darkening of the final product, apparently by supplying terminal groups to satisfy the free valences at the ends of the long-chain molecules of the resin reaction production. In the practice of the present invention, percentages of solubility regulator amounting to at least forty per cent of the total volume of reactants are required for the preparation of most of the resins in a precipitated, easily purifiable form. In all cases the amount is sufficient to cause the resin to possess a lower softening temperature, for example, five to fifty degrees centigrade, than the resin would have if the reaction were carried out in the absence of the solubility regulator.

The instant process, using the above solubility regulators, is applicable to reaction mixtures wherein the sulphur dioxide and the olefin are present in various proportions. Either of the reactants may be present in excess, or they may be present in equi-molecular proportions, as will appear from the examples hereinafter set out.

In a preferred embodiment of the invention we employ diethyl ether as the solubility regulator, carrying out the reaction between sulphur dioxide and an active unsaturated compound of the olefin type in the presence of substantial amounts of diethyl ether. The resinous product possesses valuable physical characteristics and molding qualities, and is produced in finely-divided form free from lumps or other objectionable coagulation. Since ether is an excellent washing agent for removing excess reagents and other impurities from the reacted materials, having a high rate of solubility for these impurities without dissolving the resin, the presence of ether in the reaction mass greatly simplifies the purification of the resin product. Such treatment is carried out easily and economically by the use of diethyl ether as the washing agent.

In accordance with a different but important embodiment of the invention, the solubility regulator is composed of the olefin compound which is used as the reactant. In prior practice it has been suggested that one employ various ratios of the two reactants, but an excess of sulphur dioxide has been preferred because its presence has been considered desirable to maintain the reaction product in solution. Prior workers have stated, however, that no marked differences were found in the appearance, molding properties or mechanical strength of the resinous products produced by the different ratios tried by them. In contrast to such prior experience, in this embodiment of the present invention the molar ratio of the compound to the sulphur dioxide is adjusted preferably to from 3 or 4 or more mols of the former to 1 mol of the latter, such ratios leading to resin products of marked difference in molding temperature. Under some conditions the ratio of olefin to sulphur dioxide may be as low as 2.2 to 1. However, the minimum ratio varies with the particular olefin selected, butene-1, for example, requiring a greater ratio than butene-2 to obtain comparable results.

Experience gained up to the present time indicates that the instant process is applicable to straight chain mono-olefins, conjugated diolefins, polyfunctional unsaturated compounds and other comparable unsaturated compounds which are known to react with sulphur dioxide to produce resinous reaction products soluble in one of the reactants. For molding purposes, resins produced from butene-1, butene-2, and from propylene appear to possess superior properties, primarily because of their relatively low softening temperature and the properties of the precipitated resin which permit easy purification. Resins produced from butene-2, upon molding, lead to shaped products of outstanding value, primarily because of greater heat stability. Olefin compounds of from three to six carbon atoms, however, give good results in the operation of the instant process. Mixtures of various olefins, such as butene-1 with butene-2, butene-1 with propylene, and various mixtures derived from the pyrolysis of hydrocarbons, after purification to remove objectionable hydrocarbons, if so desired, may be used. Polyfunctional unsaturated compounds having three or more carbon atoms, of the nature of allyl alcohol, allyl ethers, methylallyl ethers, allyl esters, methallyl esters and vinyl acetate, are also suitable as raw materials. These polyfunctional compounds may be referred to collectively as lower molecular unsaturated aliphatic hydroxy compounds, which terminology includes those having free hydroxy groups as well as those having combined hydroxy groups, as in ethers and esters. They also may be referred to as olefinic alcohols of less than 5 carbon atoms and their ether and ester derivatives. Resins produced by the use of the polyfunctional aliphatic compounds in the process of the present invention possess a novel combination of good properties, for they are soluble in several common solvents but at the same time are extremely tough, hard and strong.

In accordance with a specific feature of the present invention, co-polymers are formed through the use of mixtures of olefins and polyfunctional compounds. These composite resins possess certain improved properties, such, for example, as the co-polymer prepared from a mixture of butene-1 and allyl alcohol, which possesses heat stability to a degree in excess of that possessed by butene-1 resin. The proportions of the reactants may be varied within wide limits to suit particular requirements in the molding powder or product, as desired.

In the instant process, catalytic agents in general are operable. Suitable examples include organic peroxides, silver nitrate, inorganic nitrates and also ozonides, such as the ozonized olefins, acetylenes, unsaturated alcohols, unsaturated ketones and unsaturated aldehydes. Especially fine results are obtained through the use of olefin ozonides prepared under anhydrous conditions; through the use of di-isobutylene ozonide and through the use of mixtures of ascaridole and hydrogen chloride. The amount of catalyst may be varied within wide limits, generally from .01 to 5% giving satisfactory results.

The temperatures satisfactory for the processes of the present invention may vary within broad limits, as from −10 to 30° C., depending upon the particular raw materials and catalyst employed. Good results are often obtained by initially cooling the reactants to liquefy the same and then later permitting the reaction mass to warm up to room temperature.

*Example 1*

Butene-1 and sulphur dioxide in the proportions of 1:2 mols are cooled to a point at which the loss through vaporization on being introduced into the reaction chamber is negligible. The reaction chamber consists of a stainless steel cylinder with a flange top, a suitable external cooling means, and having a pressure gauge, a stirring mechanism and a graduated glass tube to which an inert gas pressure could be applied for admission of the catalyst at intervals throughout the reaction period if so desired. After the introduction of the sulphur dioxide and the olefin, the top is bolted down.

Under these cooled conditions 55%, based upon the volume of the reactants, of a solubility regulator, namely secondary-butyl alcohol, and 5% by volume of an alcohol containing a catalyst, either benzoyl peroxide or ascaridole, the amount being of the order of 0.5% of the weight of the polymer that can theoretically be obtained from the reaction mixture, is introduced into the chamber. After a slight mixing in of the catalyst, the vessel is permitted to stand for a period, depending upon which catalyst is selected, of from two to twenty-four hours, during which time the temperature rises to that of the atmosphere of the room. At this time the reaction is substantially complete, and a resin is obtained in the form of a fine grained precipitate of discrete particles. Upon removal of the reacted mixture it is subjected to an evaporation treatment to remove the excess gaseous reactants, which are condensed and made suitable for re-use. The reaction product is then washed with an organic solvent and dried, thereby removing the last traces of sulphur dioxide and, as well, of the alcohol solubility regulator. The resinous product obtained is in the form of a powdery granular mass which could be reduced, if the intended use of the same requires it, to a uniform powder by any suitable crushing operation. The agglomerated masses are so soft they can be crushed between the fingers. If desired, the crushing of the lumps may be effected prior to the washing operation.

In the foregoing process, substantially the same results are obtained by the use of other solubility regulators, namely, diethyl ether, mixtures of secondary butyl alcohol with diethyl ether, ethyl carbonate, propionic acid and isopropyl alcohol.

*Example 2*

One mol of sulphur dioxide is mixed with 4 mols of butene-1, the large excess of the latter serving as the solubility regulator, with 5%, based on the volume of the reactants, of ethyl alcohol and with a small quantity of ascaridole amounting to about 0.5% of the weight of the polymer that can be theoretically obtained from the reaction mixture. The mixture of substances is reacted in known manner in a sealed vessel at temperatures initially at about 0° C. Upon substantial completion of the reaction, an extremely fine and soft precipitate is found to have been formed. The excess reactants for the most part are evaporated off, and the remainder, principally composed of sulphur dioxide, is readily removed from the mass by a simple washing operation. Upon drying, a powdery resinous material is obtained. These granules appear opaque when examined under a microscope, whereas granules obtained by grinding a reaction product produced with an excess of sulphur dioxide and without a solubility regulator appear transparent.

*Example 3*

A reaction vessel of conventional construction is partially filled with the following substances in the proportions indicated: 1 mol of sulphur dioxide, 2 mols of butene-1, half of which serves as a solubility regulator, 5% by volume of ethyl alcohol, 25% by volume of an additional solubility regulator, namely, isopropyl alcohol, and benzoyl peroxide in a quantity amounting to about 0.5% of the weight of the polymer that can be theoretically obtained in the reaction mixture. Upon substantial completion of the reaction, the excess olefin and the greater part of the unreacted sulphur dioxide are removed by vaporization, and the residual sulphur dioxide and alcohols are removed by filtering and washing with water.

This example, using only 50% by volume of the reactants for solubility regulation, represents an extremely desirable embodiment of the present invention due to the fact that comparatively small equipment is needed to produce a unit quantity of resin and also to the fact that a material is obtained having somewhat superior qualities for general purposes.

Instead of using isopropyl alcohol, other solubility regulators may be employed, such as propionic acid, diethyl ether, secondary-butyl alcohol or ethyl carbonate, some of which will necessitate organic washing liquids because of their insolubility in water, the residue of the liquids being removed by evaporation.

Example 4

A mixture of butene-2 and sulphur dioxide in the molar ratio of 3:1, respectively, together with 55% by volume of normal butyl alcohol, is introduced into a glass tube cooled with dry ice and ether. A catalyst, composed of the ozonide of butene-2 prepared under anhydrous conditions, in an amount corresponding to 0.5% of the weight of the resin theoretically obtainable by the reaction, is dissolved in a quantity of ethyl alcohol amounting to 5% of the volume of the reaction mixture. The catalytic mass is then added to the reactants in the tube, and the tube is sealed and placed in a bath maintained at 0° to 10° C. Reaction commences within a few minutes after the tube is placed in the bath. The temperature may be permitted to increase, but if permitted to rise too high, the yield of the resin is lowered. After a period of one hour the olefin is to a very large extent converted into a resin in the form of a granular precipitate. This precipitate may be purified as described in the foregoing examples.

Example 5

A mixture of butene-2 and sulphur dioxide in the molar ratio of 3:1, respectively, together with 55% by volume of normal butyl alcohol, is introduced into a glass tube and cooled with dry ice and ether. A quantity of diisobutylene ozonite corresponding to 0.5% of the weight of the resin theoretically obtainable, the ozonite being dissolved in a small quantity of ethyl alcohol corresponding to 5% of the volume of reaction mixture, is then introduced into the glass tube. The tube is next sealed off and placed in a water bath maintained at 0° to 10° C. Reaction begins within a short time, and conversion is substantially complete in the period of one hour. The resin forms as a granular precipitate which is then purified by evaporation of excess reactants, washing and drying.

Example 6

A glass tube is cooled with dry ice and ether and a mixture of butene-1 and sulphur dioxide in the molar ratio of 3:1, respectively, is introduced. Next, a quantity of di-isobutylene ozonide corresponding to 0.5% of the weight of the resin theoretically obtainable, dissolved in a small quantity of ethyl alcohol, is added to the cooled mixture in the glass tube. The tube is sealed and placed in the water bath at 0° to 10° C. Reaction begins within a few minutes and results in the conversion of most of the sulphur dioxide to resin in a period of one hour. The reaction mixture, after being removed from the tube, is purified as hereinbefore described, the resulting product being a granular mass, substantially free of gaseous materials, which if present, would cause bubbles to form in products molded therefrom.

Example 7

A glass tube containing a mixture of butene-1 and sulphur dioxide in the molar ratio of 2.5 to 1, respectively, is cooled with dry ice and ether. To this mixture there is added 0.5% of ascaridole, followed by 1% by weight of hydrogen chloride dissolved in a small quantity of alcohol. The tube is sealed and then permitted to warm up to room temperature. The reaction begins within one minute and is completed within 30 minutes. The reaction product, obtained in good yield, is in the form of a granular resin which is purified by the steps disclosed in the preceding examples.

Example 8

Three mols of propylene and 1 mol of sulphur dioxide are reacted in a steel tube containing also 15% of the volume of the reactants of secondary butyl alcohol and 0.5% diisobutylene ozonide as a catalyst. The reaction is very rapid and results in a yield of 71% at the end of a period of 15 minutes. The product obtained is a soft precipitate which can be reduced to an extremely fine powder merely by crushing between the fingers. This resin can be molded at a temperature of 110° C., whereas a resin made with the same reactants using an excess of sulphur dioxide is moldable only at temperatures above 170° C.

Example 9

Seven and three-tenths parts of sulphur dioxide, 19.2 of vinyl acetate, 8.1 parts of n-butyl alcohol, all parts by volume, and a quantity of diisobutylene ozonide catalyst equivalent of 1% by weight of the total reactants are sealed in a suitable tube and placed in a bath of ice and hydrochloric acid. Reaction commences almost immediately. After standing overnight the tube is opened. A resinous precipitate has formed, this precipitate then being removed and washed with ether to remove impurities. Upon drying the product is a very fine, white powder which requires no grinding or crushing and which molds readily into a transparent, shaped article at a temperature of 100° C.

Example 10

A reaction mixture composed of 50 parts of sulphur dioxide, 153 parts of allyl alcohol and 178 parts of n-butyl alcohol, all parts by volume, is placed in a suitable stainless steel reaction vessel, after which a diisobutylene ozonide catalyst in a proportion equivalent to .5% by weight of the total reactants, dissolved in 25 parts of butyl alcohol, is forced into the vessel under pressure and mixed by stirring. Reaction begins within a few minutes and is permitted to continue for a period of one hour, when the vessel is opened and the resin removed. Since the resin is obtained in a very finely divided condition, complete removal of the impurities can be effected by a simple washing operation and without the assistance of a grinding operation. The material produced in this manner molds readily and forms an extremely strong, tough, heat resistant product at a temperature considerably lower than the resin made with the same reactants using an excess of $SO_2$.

Example 11

A reaction mixture composed of 25 parts of sulphur dioxide, 100 parts of butene-1, 68 parts of allyl propionate and 10 parts of n-butyl alcohol, all parts by volume, is placed in a suitable stainless steel reaction vessel equipped with a stirrer. A catalyst composed of diisobutylene ozonide amounting to .5% by weight of the total reactants, dissolved in 25 parts of n-butyl alcohol, is forced into the vessel under pressure during stirring. Reaction begins immediately and is permitted to continue for a period of one hour, after which the vessel is opened and the resin removed. The resin, in the form of a very fine powder, is washed completely without the assistance of any grinding operation. The material so produced is molded at 110° C. into a transparent article.

*Example 12*

A reaction mixture composed of 50 parts of sulphur dioxide, 145 parts of butene-1, 114 parts of allyl alcohol and 108 parts of n-butyl alcohol, all parts by volume, is placed in a suitable stainless steel reaction vessel equipped with a stirrer. A catalyst composed of di-isobutylene ozonide amounting to .5% by weight of the total reactants dissolved in a small portion of n-butyl alcohol is forced into the vessel under pressure during stirring. Reaction commences within a period of a few minutes. After one hour has elapsed the resin is removed in the form of a fine powder and freed of impurities without the assistance of any grinding or crushing operation. The material prepared in this manner is then molded at a temperature of 110° C. and produces a tough, heat-stable article.

The fine-grain-precipitate resins produced by the foregoing processes have a high stability during storage and can be molded at temperatures around 100° C., or at temperatures from 30 to 50 degrees lower than corresponding polymers produced in accordance with the ordinary prior practice wherein no solubility regulator is employed.

The effect of the solubility regulator is apparently to stop the "chain reaction" of the sulphur dioxide with the olefin before a polymer of very high molecular weight is formed. The solubility regulator deactivates the long chain molecules and causes them to cease growing. The molecules so deactivated, being insoluble in the reaction mixture by virtue of the presence of the solubility regulator, coalesce and precipitate out, thereby producing a powdery resinous material of comparatively low molecular weight. It is believed, therefore, that the thread or chain molecules in general can continue to increase in length so long as they are in solution in the reaction mixture. By rendering the molecules of the polymer insoluble in the reaction mass, through the use of a solubility regulator in accordance with the present invention, the polymerization of the precipitated molecules ceases.

Although the foregoing explanation appears to describe the effect of the solubility regulator, it should be understood that the invention is not to be limited to any theory of operation. The success of the process is attributed to the action of the solubility regulator, whatever that may be, which permits the molecules to grow to a size possessing the desired resinous properties without permitting them to grow to a point where the molecular weight is sufficiently great to affect seriously the solubility of the resin in various solvents, or its softening point. The action of the solubility regulator also prevents the formation of hard, hornlike solids upon the release of pressure, thereby yielding a precipitate of discrete particles capable of being purified with the minimum of effort and expense. Laboratory tests on solutions of the resins, based on viscosity measurements, indicate that the molecular weight of the resin is regulated by the instant process.

The instant invention provides a process for simultaneously controlling the molding temperature and the particle size of precipitated resins, and by proper selection of the solubility regulator and the proportion thereof, products of predetermined properties to suit specific requirements can be obtained.

The advantages of the present invention may be summarized as follows: The unreacted materials can be removed by simple washing and drying operations without grinding. Molding compositions are produced which are free of substances which gasify or cause discoloration during the heat treatment. The resinous products are of a high degree of stability. The resins soften and may be molded at considerably lower temperatures than the resins of the prior art; for example, the butene-1 resin is moldable below 120° C. and, if desired, at a temperature as low as 80° C. as compared with 125-180° C. for the corresponding prior-art resin, and the butene-2 resin of the present invention is moldable below 140° C., or as low as 110° C., as compared with 170° C. for the corresponding prior-art resin. Somewhat lowered fusion temperatures may be obtained by the use of proper solubility regulators even under those conditions where the regulator is not used in sufficient quantity completely to eliminate the necessity for grinding. The present invention, therefore, in a special embodiment thereof, relates to a method for regulating the softness, or increasing the grindability, and simultaneously reducing the fusion temperature of resins of the sulphur dioxide-olefinic type, involving reacting sulphur dioxide with an olefin or other unsaturated compound in the presence of a solubility regulator in a quantity predetermined to effect the desired reduction in the softness and fusion temperature of the resinous product. Another advantage lies in the ease of operation, due to the fact that the precipitated resin may be removed from the reaction vessel in the form of a slurry or powder, whereas the resin of the prior art, if solidification occurred within the vessel, could be removed only with considerable difficulty.

Another outstanding advantage of the instant process of producing resins in a fine granular condition is the ease with which pigments, fillers, dyes and plasticizers can be incorporated therein, in preparation for molding or other operations. Conventional addition products in general may be employed with the resin. Suitable fillers include wood flour, asbestos, alpha cellulose, powdered mica and cotton floc. These addition products may be introduced into the resin by any of the processes suggested in the art.

Yet another advantage of the resins of the instant invention lies in the facility with which they may be brought into solution in solvents in the compounding of adhesives, cements, paints, varnishes, lacquers and other coatings, laminating agents and cloth-impregnating compounds.

The resins produced in accordance with the processes of the present invention may be employed in the plastic field to produce molded products by compression, or injection; and to produce various laminated materials or boards. The resins may be used in coating compositions, in spirit varnishes, as well as in oil varnishes. They also may be used for the impregnation and coating of textile fibers, in the production of adhesives and cements and in the compounding of rubber-like materials.

It should be understood that the present invention is not limited to the specific compounds and procedural steps herein given, but that it extends to all equivalent substances and the equivalent steps within the scope of the claims appended hereto.

We claim:

1. In the production of resins from sulphur dioxide and reactive olefinic compounds, the steps comprising reacting sulphur dioxide with a straight chain olefinic compound in the presence of an organic liquid miscible with the initial reactants but which is not a solvent for the resin formed, said liquid having the property of and being present in a sufficient quantity to cause the resin produced to separate in the form of finely divided particles capable without grinding of being washed substantially completely free of unreacted materials and of being molded at a lower temperature than the resinous product producible in the absence of such organic liquid.

2. The process described in claim 1 wherein the olefinic compound reacted with sulphur dioxide is a straight chain olefin hydrocarbon.

3. The process described in claim 1 wherein the olefinic compound reacted with sulphur dioxide is butene-1.

4. The process described in claim 1 wherein the olefinic compound reacted with sulphur dioxide is butene-2.

5. In the production of sulphur dioxide-olefin resins, the steps comprising reacting sulphur dioxide with a straight chain olefin in a molar ratio of one of the former to more than two of the latter, said excess olefin serving to cause the resin reaction product to separate out in the form of discrete particles from which unreacted materials may be removed solely by washing.

6. In the production of resins from sulphur dioxide and reactive olefinic compounds, the steps which comprise reacting sulphur dioxide and a straight chain olefinic compound in the presence of a water-soluble organic liquid miscible with the initial reactants but which is not a solvent for the resin formed, said liquid having the property of and being present in a sufficient quantity to cause the resin produced to separate in the form of finely divided particles capable without grinding of being washed substantially completely free of unreacted materials and of being molded at a lower temperature than the resinous product producible in the absence of such organic liquid, and washing the precipitated mass with water to remove the organic liquid and the last traces of the initial materials, thereby forming a purified resin free of deleterious impurities.

7. The method of producing resins of the sulphur dioxide olefin type, which comprises reacting sulphur dioxide and an active straight chain olefinic compound in the presence of diethyl ether in an amount causing the production of a fine precipitated resin in the reaction mass.

ROBERT C. HILLS.
MAXWELL M. BARNETT.